March 19, 1957 S. L. PASTOR 2,785,892

CONTROL APPARATUS FOR MAGNETIC RECORDER-REPRODUCER

Filed Feb. 9, 1955 3 Sheets-Sheet 1

Inventor:
Sheldon Lee Pastor.
By. Zabel, Baker, York, Jones & Dithmar
Attorneys.

Inventor.
Sheldon Lee Pastor.
By. Zabel, Baker, York, Jones & Dithmar
Attorneys.

Inventor.
Sheldon Lee Pastor.
By. Zabel, Baker, York, Jones & Dithmar
Attorneys.

United States Patent Office 2,785,892

Patented Mar. 19, 1957

2,785,892

CONTROL APPARATUS FOR MAGNETIC RECORDER-REPRODUCER

Sheldon Lee Pastor, Chicago, Ill., assignor to Revere Camera Company, Chicago, Ill., a corporation of Delaware

Application February 9, 1955, Serial No. 487,010

12 Claims. (Cl. 271—2.3)

This invention relates to a magnetic recorder-reproducer, and more particularly to improved apparatus for controlling the operation thereof.

Most magnetic recorder-reproducers use either magnetic tape or magnetic wire as the record medium. For convenience, the invention will be described with reference to a recorder-reproducer designed for magnetic tape.

Most tape recorders are adapted to drive the tape between storage and takeup reels at different speeds and in different directions, depending upon the operating function to be performed. Thus, for example, the tape is driven forward at slow speed for the recording and playback functions. In addition, means are provided for driving the tape in forward direction at a rapid speed (rapid forward) so that desired portions of the tape quickly can be brought into operating position. Similarly, means are provided for driving the tape at a rapid speed in reverse direction (rapid rewind) for the purpose of rewinding the tape on the storage reel.

One major objective in the design of tape recorders is to provide a machine which can be operated satisfactorily without practice or detailed study of complicated instructions. Nevertheless, most tape recorders have a number of control knobs, buttons, or levers which must be operated in predetermined sequence to avoid difficulties such as breaking or spilling the tape, to say nothing of more serious damage.

One object of the invention, therefore, is to provide control apparatus which makes a tape recorder substantially foolproof. The controls of this apparatus are few in number and, when provided with simple legends, the functions performed thereby are readily apparent. The apparatus is such that even if the legends were ignored, it virtually would be impossible to operate the recorder in an improper or damaging manner. In other words, a recorder provided with the control apparatus of the invention does not have to be "learned" before it can be operated satisfactorily.

Another object of the invention is to provide control apparatus which effectively permits the use of one motor in a tape recorder, compared with the two or more motors often used to obtain comparable high quality. Many tape recorders, for example, use as many as three separate motors, one for slow speed drive for recording and playback and one each for rapid forward drive and rapid rewind drive.

Another object is to provide control apparatus having safety or interlock features which make it impossible to perform operating functions in improper sequence. One safety feature, for example, makes it possible to shift from slow speed forward drive into rapid forward or rapid rewind drives by manipulating only a single control element. One interlock, for example, makes it impossible to place the recorder in slow speed drive until disengagement of the rapid forward or rapid rewind drives. These features insure against tape distortion or breakage. Another interlock places the tape driving system in "neutral" when the power switch is turned "off". This disengages certain resilient drive elements and avoids the formation of quality-impairing flat spots on the peripheries thereof.

Other objects, advantages and features of the invention will be apparent as the description proceeds, reference being had to the accompanying drawings wherein one form of the invention is shown. It is to be understood that the description and drawings are illustrative only and that the scope of the invention is to be measured by the appended claims.

Figure 1:
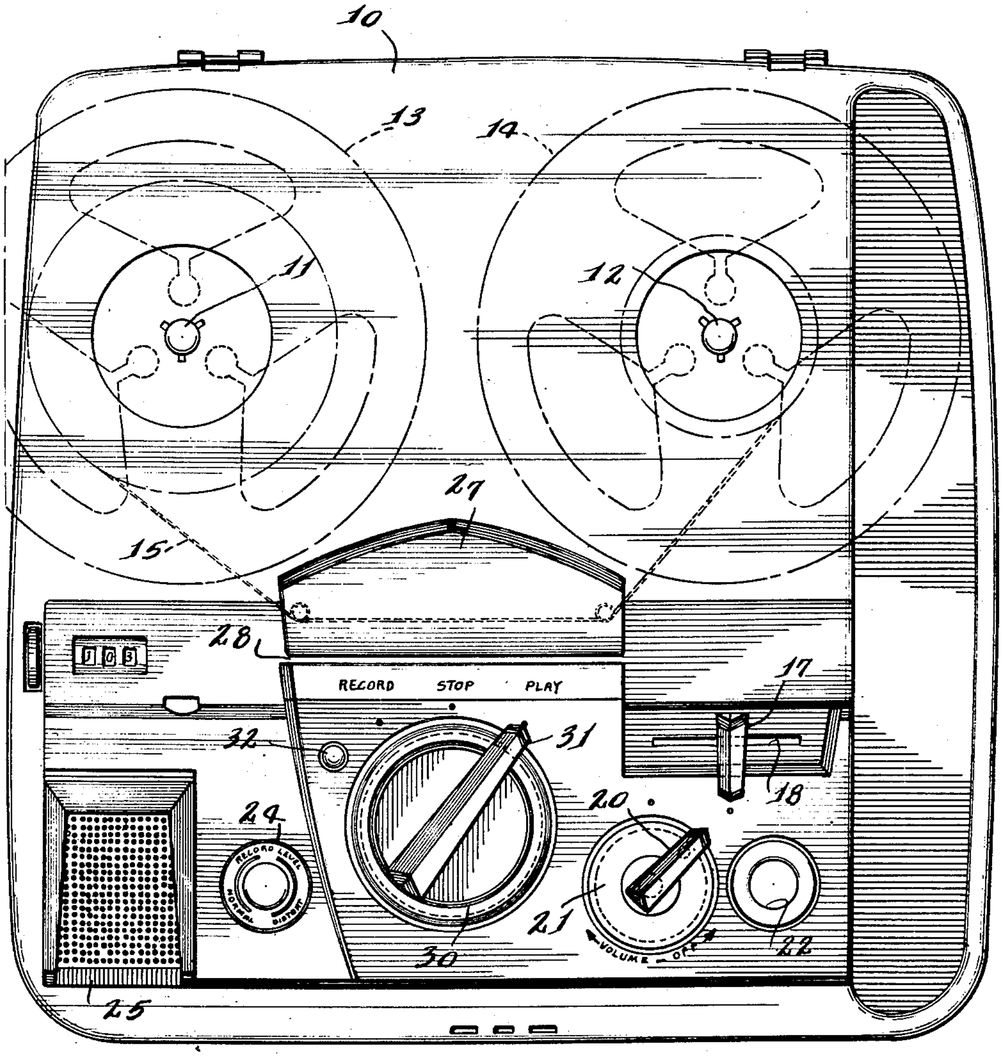
Fig. 1 is a plan view of the operating panel of a tape recorder embodying the invention.

Referring now to the drawings, Fig. 1 shows an operating panel 10 of a tape recorder embodying the control apparatus of the invention. Spindles 11 and 12 respectively carry the usual storage and takeup reels 13 and 14.

Magnetic tape 15 travels in one direction or the other between reels 13 and 14 depending on the particular function being performed by the recorder. During the record and playback functions tape 15 travels from storage reel 13 to takeup reel 14 at slow speed. When it is desired to operate on an intermediate portion of the tape contained on storage reel 13, the tape is driven in rapid forward drive until such portion is made available. At the conclusion of a recording operation or when all of the tape is contained on takeup reel 14, the tape is driven in rapid rewind in order to replace the tape on storage reel 13 so it is in proper position for the playback function.

The rapid speed drives, both rapid forward and rapid rewind, are responsive to a rapid speed lever 17 which extends through an elongated slot 18 in panel 10. As will appear later, lever 17 is moved to the right (the direction the tape travels) for rapid forward and to the left for rewind.

The numeral 20 designates an "off-on-volume" knob while 21 designates a tone control knob associated therewith. A jack 22 for a connection from a microphone, radio, or phonograph is located to the right of knobs 20 and 21.

At the left of the panel front is a recording level indicator 24 and a microphone 25, the latter being received in a pocket provided in panel 10.

The central portion of operating panel 10 has a housing 27 which encloses the sound head of the recorder. Housing 27 is provided with an elongated slot 28 to receive a portion of the length of tape extending between reels 13 and 14.

A function knob 30 is located on the front central portion of panel 10. This knob is one of the main controls of the control apparatus of the invention. As indicated by the associated legends and knob pointer 31, knob 30 has three function positions, a center, neutral position for "stop," a counterclockwise position for "record," and a clockwise position for "playback."

Operation of the recorder with the aforesaid controls is extremely simple and virtually foolproof. The machine is turned "on" by means of knob 20. After a suitable warmup period for the electronic components, function knob 30 is turned either to the left or to the right depending on whether record or playback function is desired. The illustrated recorder has a push button 32 which must be depressed before it is possible to turn function knob 30 to the record position. This feature tends to eliminate the possibility of accidentally erasing material previously recorded on the tape.

When it is desired to stop the tape, function knob 30 may be moved manually to neutral or "stop" position. Alternatively, "off-on-volume" knob 20 may be moved to "off" position and this action returns function knob 30 to the "stop" position, as will be seen.

Regardless of the position of function knob 30, rapid lever 17 may be moved right or left to provide the desired rapid speed drive. The control apparatus is such that actuation of lever 17 returns function knob 30 and associated mechanism to "stop" position before establishing either of the two rapid drives. This feature, in view of the manner in which the tape is driven in slow speed, insures that there will be no tape distortion or breakage in shifting to one of the rapid drives. An interlock is provided, as will be seen, to prevent the actuation of function knob 30 as long as rapid lever 17 is in either of its rapid drive positions.

Figure 2:
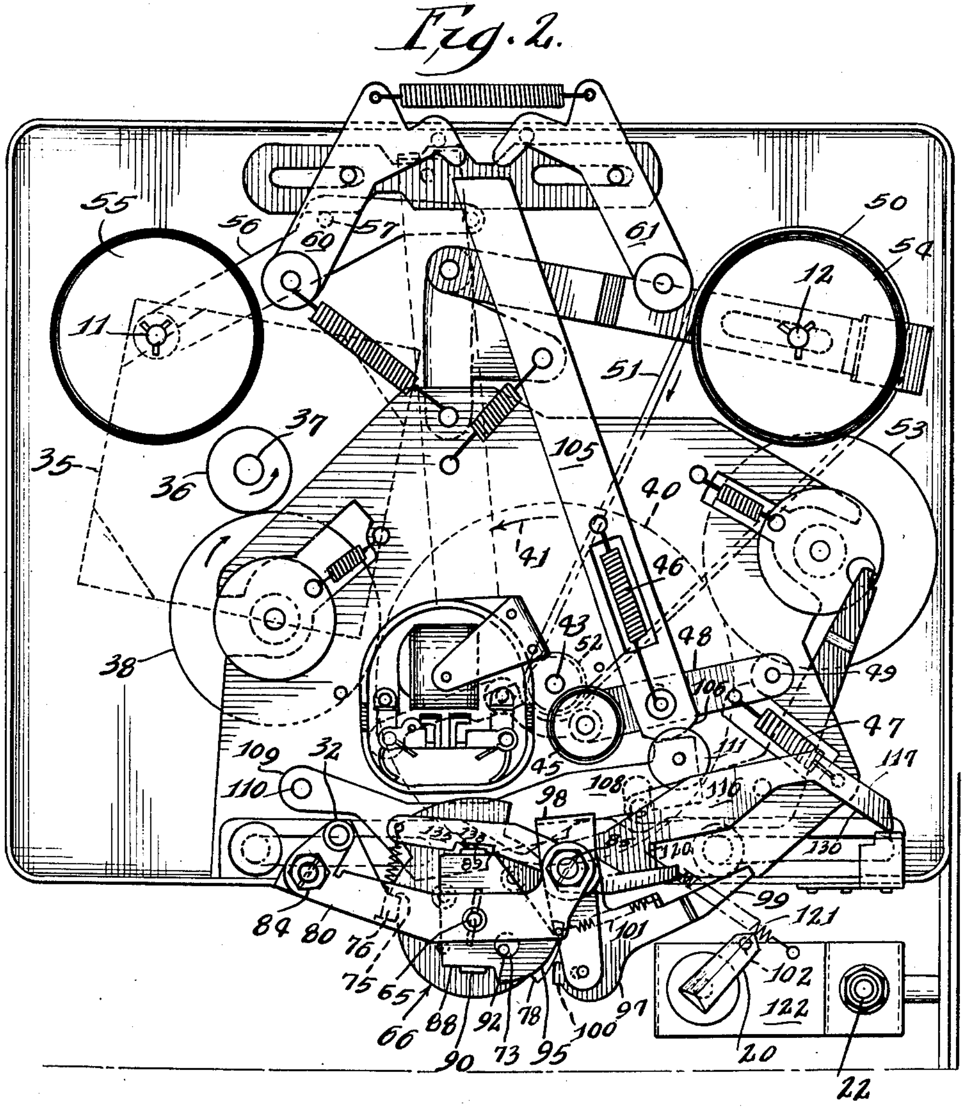
Fig. 2 is a plan view of control apparatus embodying the invention, the view also showing various other parts of the recorder in assembled relation.

Referring to Fig. 2, the various drive elements which respond to the control apparatus of the invention are shown in assembled relationship. Many of these drive elements are essentially the same as those shown in the prior application of Moore and Pasto, Serial No. 293,814, filed June 16, 1952, and that application may be referred to for further detail in these regards.

Describing these drive elements briefly, power is supplied by a motor 35 having a motor roller 36 on its shaft 37. Motor roller 36 engages an idler roller 38 which in turn engages and drives a flywheel 40. As indicated by arrow 41, flywheel 40 rotates in counterclockwise direction and at an extremely uniform rate.

During the record and playback functions, tape 15 is driven by a capstan 43 carried by flywheel 40. Capstan 43 works against an idler pressure roller 45 which, during record and playback, is biased against capstan 43 by spring 46. Pressure roller 45 also is subject to a bias in the opposite direction, i. e. a direction away from capstan 43, this bias being provided by a spring 47. As here shown, pressure roller 45 is rotatably mounted on a lever 48 which has an end pivoted at 49. During play or record the bias of spring 47 is neutralized, as will be seen, and the tension of spring 46 provides the proper, drive relationship between pressure roller 45 and capstan 43.

Takeup reel 14 has a takeup roller 50 which is driven in counterclockwise direction by a belt 51 extending between the roller and a pulley 52 carried on the shaft of flywheel 40. Roller 50 is related to reel 14 by a friction clutch (not shown). Thus belt 51 drives takeup reel 14 in proper direction during both the record and playback functions.

For the rapid forward function takeup reel 14 is driven at a greatly increased rate. This rapid drive is provided by an idler roller 53 which, in response to movement of rapid speed lever 17 to the right, is cammed into both flywheel 40 and a roller 54 which has a direct connection with takeup reel 14 and a frictional relationship with takeup roller 50. Fig. 2 illustrates the control apparatus in rapid forward drive.

Storage reel 13 has a storage roller 55 which is mounted at one end of a lever 56. Lever 56 is pivoted on a stud 57. For rapid rewind drive, lever 56 is pivoted to move storage roller 55 into engagement with motor roller 36 which then is effective to drive storage roller 55 in rewind direction at a rapid rate.

Brake assemblies 60 and 61, which have directional sense and different degrees of braking drag, function in correlated relationship with the respective rapid forward and rewind drives, as more fully described in the aforesaid prior application. Sufficient to say, these brake assemblies cooperate to brake and release the respective reels so that the functions occur without tape spilling or distortion.

The above described drive and brake elements per se form no part of this invention. They are mentioned for better understanding of the control apparatus of the invention which now will be described.

Figures 3, 4:
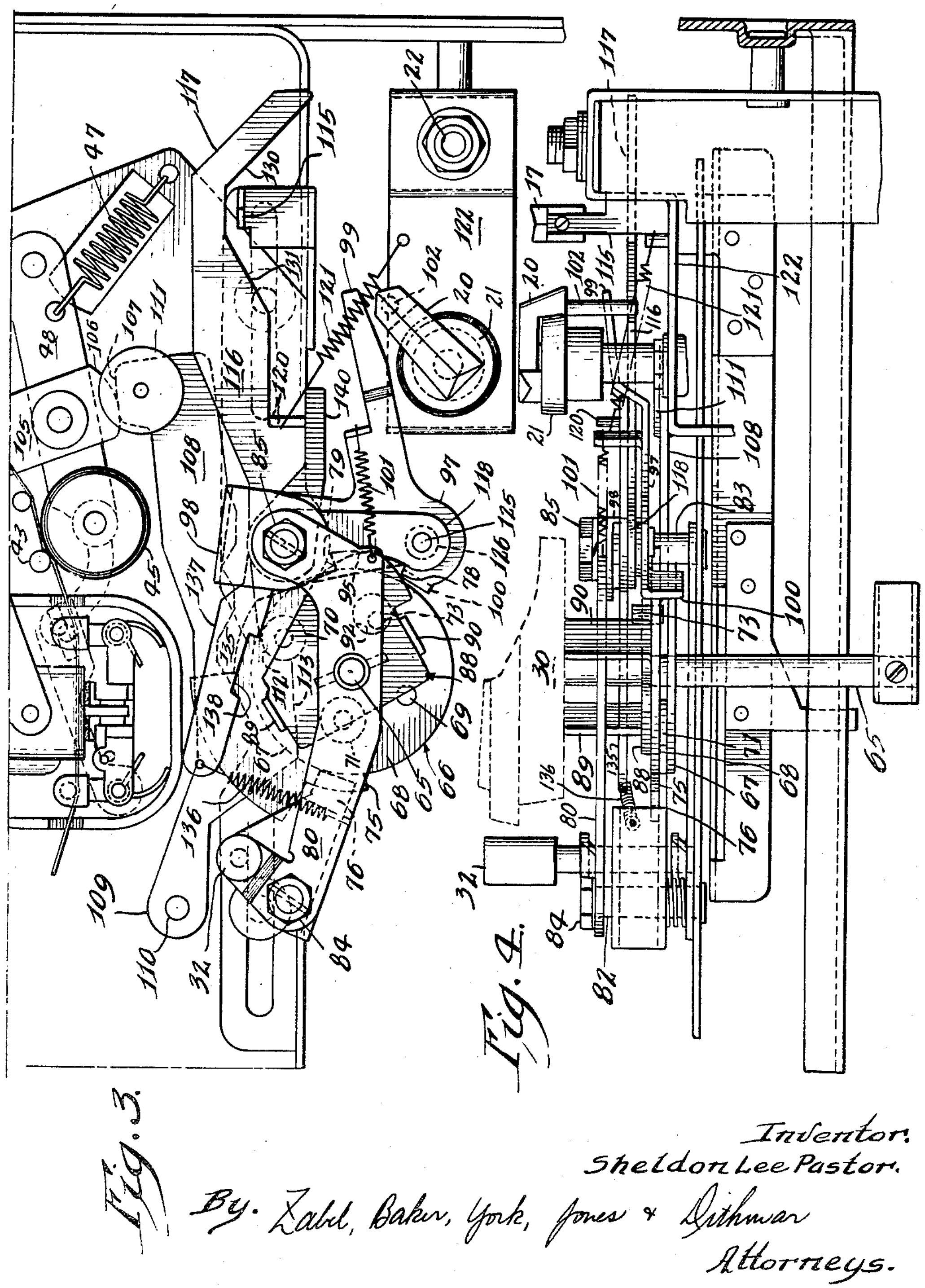
Fig. 3 is an enlarged plan view of the control apparatus, the components of the apparatus being shown in record function position.
Fig. 4 is a front elevational view of the apparatus shown in Fig. 3.

Referring now to Figs. 3 and 4, the control apparatus of the invention includes a function shaft 65. Shaft 65 need not be rotatable, although in practice it generally is desirable to have the shaft rotatable so it can actuate certain electric switches (not shown).

An irregularly shaped function cam 66 is carried on function shaft 65. Cam 66 may or may not be keyed to shaft 65, although, in the form shown, the cam is keyed to the shaft. Thus, when cam 66 is rotated, shaft 65 also rotates so it may actuate the aforementioned electric switches.

Cam 66, as here shown (Fig. 4), is made up of two spaced plates, a circular bottom plate 67 and an irregularly shaped top plate 68. Plates 67 and 68 are held in spaced relation by spacers 69, two of which are provided with cam rollers 70 and 71. The cam rollers are hereinafter called camming portions. An upstanding stud 73 extends from the upper surface of top plate 68. The function of stud 73 will be mentioned presently.

The periphery of top cam plate 68 has three shoulder portions, one of which is more or less optional and the other two of which cooperate with other essential elements of the control apparatus. Shoulder 75 is optional. It is subject to engagement by a pawl 76 which is depressed by the aforesaid push button 32 in order to permit a shift to the record function. Depressing button 32 moves pawl 76 downwardly and out of engagement with shoulder 75. The depressed position of pawl 76 is shown in Fig. 4.

The other two shoulders on the periphery of top plate 68 are shoulders 78 and 79. Inasmuch as shoulder 78 cooperates in the record function, as shown in Fig. 3, this shoulder may be referred to as the record shoulder. Similarly, shoulder 79 may be referred to as the playback shoulder.

From the foregoing, it will be seen that function cam 66 has two camming portions, namely rollers 70 and 71, and two shoulder portions, namely shoulders 78 and 79. An additional shoulder 75 is provided but, as previously mentioned, this shoulder is optional.

The upper end of function shaft 65 extends through an opening in a bracket member 80. This bracket is rigidly mounted on the upper end of spaced posts 82 and 83 (Fig. 4) by means of screws 84 and 85. The post 83 forms the pivotal axis of a number of elements of the control apparatus, as will be seen.

The aforesaid function knob 30 is carried by a cam driver 88 which is operatively associated with function cam 66. As here shown, cam driver 88 is an irregularly shaped plate loosely mounted on function shaft 65. Cam driver 88 is provided with two upstanding arms 89 and 90 which enter recesses in knob 30.

Cam driver 88 has a lost motion connection with function cam 66. As here shown, an aperture 92 is provided in cam driver 88, the diameter of aperture 92 being substantially greater than the diameter of stud 73 on top cam plate 68. The stud 73 extends through aperture 92 and provides a relationship whereby cam driver 88 may be turned through a few degrees without imparting movement to cam 66. This lost motion relationship permits cam driver 88 to perform a camming function, as will be seen.

The camming function just referred to is performed by a cam part 95 which is a peripheral portion of cam driver 88 having a slightly larger radius, measured from function shaft 65, than the radius of the portion of function cam 66 between the shoulders 78 and 79. As will be seen, cam part 95 is effective to disengage a pawl, presently to be described, from either of the shoulders 78 and 79.

An angle-shaped pawl-carrying member 97 has an arm 98 mounted in a pivotal manner on post 83. The other arm of member 97, namely arm 99, extends into effective relation with off-on-volume knob 20. This relationship is an important part of the control apparatus, as will be seen.

Member 97 has a downwardly extending pawl 100 which alternatively engages the shoulders 78 and 79 of function cam 66. A spring 101 biases pawl 100 against the periphery of cam 66. When cam 66 is in neutral or "stop" position, pawl 100 engages the cam periphery at a point more or less midway between shoulders 78 and 79. When cam 66 is turned counterclockwise to record position, as shown in Fig. 3, shoulder 78 is engaged by pawl 100. Alternatively, when cam 66 is rotated clockwise to play (or playback) position, shoulder 79 is engaged by pawl 100. In each case the pawl and shoulder relationship is effective to maintain cam 66 in the position to which it is rotated.

Off-on-volume knob 20 has a camming portion such as depending finger 102, best shown in Fig. 4, which extends into effective relation with arm 99 of pawl-carrying member 97. When knob 20 is in "on" position, as shown in Fig. 3, finger 102 is remote from arm 99 so that member 97 may turn clockwise to a position where pawl 100 engages one or the other of shoulders 78 and 79. When knob 20 is turned counterclockwise to "off" position, finger 102 engages arm 99 and causes counterclockwise movement of pawl-carrying member 97. This movement withdraws pawl 100 from its position against either shoulder 78 or 79 and allows function cam 66 to return to neutral or "stop" position. In addition, when knob 20 is in "off" position, finger 102 prevents pawl 100 from engaging shoulders 78 or 79 as otherwise would be possible if function knob 30 were turned to play or record positions. This prevents harmful pressure roller-capstan engagement and avoids flat spots.

The force which returns function cam 66 to neutral or "stop" position is derived from the force which biases pressure roller 45 away from drive capstan 43. This bias force, in part supplied by spring 47, is communicated to cam 66, as will be seen.

Pivoted lever 48, on which pressure roller 45 is mounted, is connected to one end portion of a long link 105. The end portion of link 105, in the form shown, extends beyond a side edge of lever 48 and terminates in an arcuate end 106. Arcuate end 106 engages end 107 of a function arm 108 which engages function cam 66.

Function arm 108 has its left end 109 (Figs. 2 and 3) pivoted at 110. A pair of plates 111 are secured to lever end 107, the plates being mounted in alignment on opposite faces of end 107 and extending beyond the end in the direction toward arcuate end 106 of link 105. The plates 111, of course, maintain proper alignment between the abutting ends 106 and 107.

Generally midway between the two ends of arm 108 is an arcuate edge portion 112 (Fig. 3) which is engaged by cam roller 70 of function cam 66 when the control apparatus is in record position, as shown in Fig. 3. To the left of arcuate edge portion 112 is a straight edge portion 113 which is engaged by cam roller 71 when the control apparatus is in playback position.

Bias spring 47 urges pressure roller lever 48 in counterclockwise direction. The angular position of lever 48 is determined by the location of function arm 108 which engages link end 106. Bias force from lever 48 is communicated to arm 108 through link end 106. Arcuate edge portion 112 of function arm 108, as the parts are shown in Fig. 3, engages cam roller 70 of cam 66. The force applied to roller 70 by arm 108 is eccentric to the axis of cam 66, and therefore the force tends to turn cam 66 in clockwise direction. Rotation of cam 66 is prevented, as shown in Fig. 3, by the engaged relationship between pawl 100 and record shoulder 78 of cam 66. However, when pawl 100 is moved out of engagement with shoulder 78, the aforesaid eccentrically applied force is effective to rotate function cam 66 to neutral or "stop" position.

The same action takes place when function cam 66 is in playback position. In this case cam roller 71 engages straight edge portion 113 of function arm 108 and pawl 100 engages playback shoulder 79 of the cam, the relationship between pawl 100 and shoulder 79 being effective to restrain the cam against counterclockwise rotation. However, when pawl 100 is withdrawn from shoulder 79, the force applied eccentrically by function arm 108 is effective to rotate cam 66 in counterclockwise direction to neutral or "stop" position.

It is to be noted that when cam 66 is in "stop" position, pressure roller 45 is out of engagement with drive capstan 43, a relationship which prevents the formation of a flat spot on the resilient periphery of pressure roller 45. Inasmuch as cam 66 is returned to "stop" position when off-on-volume knob 20 is turned to "off" position, it will be seen that a safeguard thus is provided which prevents the recorder from being left in such condition that a flat spot can develop. Other resilient drive rollers similarly are disengaged from cooperating rollers when pressure roller 45 is separated from capstan 43 and the formation of flat spots thereon also is avoided.

As previously mentioned, cam driver 88 has a lost motion connection with function cam 66. This connection is provided by stud 73 on cam 66 and aperture 92 of substantial diameter in cam driver 88. This lost motion connection in cooperation with cam part 95 of cam driver 88 permits return of function cam 66 to neutral or "stop" position by manual actuation of function knob 30.

Assuming the parts are in the position shown in Fig. 3, the function knob pointer 31 is aligned generally with the upstanding arms 89 and 90 of cam driver 88. When function knob 30 is manually rotated clockwise toward "stop" position, cam driver 88 will turn through a few degrees before the far side of aperture 92 engages stud 73. This limited rotation is sufficient for cam part 95 of cam driver 88 to push pawl 100 out of engagement with record shoulder 78. With pawl 100 thus disengaged, the aforesaid force applied by function arm 108 is enabled to rotate function cam 66 to "stop" position. Similarly, when function knob 30 is in playback position, as shown in Fig. 1, manual rotation of the knob in counterclockwise direction is effective, by virtue of the lost motion connection of cam driver 88 and cam 66, to disengage pawl 100 from playback shoulder portion 79, thereby permitting the force of function arm 108 to rotate cam 66 in clockwise direction to "stop" position.

As so far described two arrangements thus are provided for returning cam 66 to neutral or "stop" position from either record position or playback position. One arrangement, just described, involves manual rotation of function knob 30. Inasmuch as normal use of a recorder involves switching back and forth between record and playback functions, it will be seen that manual actuation of function knob 30 will be employed extensively. Hence, the camming function of cam driver 88 which is provided by the lost motion connection and cam part 95 is of great importance.

The other arrangement for returning function cam 66 to "stop" position includes camming portion finger 102 associated with off-on-volume knob 20 and arm 99 of pawl-carrying member 97. It is this second arrangement which prevents the formation of flat spots on the various pressure rollers by insuring that the pressure rollers are separated from cooperating rollers when the recorder is turned "off."

As more fully described in the prior application of Moore and Pastor, the rapid forward and rapid rewind functions are responsive to actuation of rapid speed lever 17. Lever 17 includes an arm 115 (Figs. 3 and 4) which is located in effective relation with a movable trip lever 116.

Movable trip lever 116 is pivoted on post 83 and has two arms extending generally at right angles to each other. Arm 117 is the portion of trip lever 116 which is in effective relation with arm 115 of rapid speed lever 17, while arm 118 has a lost motion connection with pawl-carrying member 97. Trip lever 116 also has an upstanding lug 120 to which is connected one end of a bias spring 121. The other end of spring 121 is connected to a chassis plate 122. Spring 121 biases trip lever 116 in clockwise direction.

As previously mentioned, arm 118 of trip lever 116 has a lost motion connection with pawl-carrying member 97. This connection is provided by a stud 125 on arm 118 and a cooperating aperture 126 of substantial diameter in pawl-carrying member 97. The lost motion connection permits the previously described movements of pawl-carrying member 97 without interference by trip lever 116. In other words, when trip lever 116 stays fixed in the position shown in Fig. 3, pawl-carrying member 97 may rotate back and forth to effect engagement and disengagement of pawl 100 and shoulders 78—79.

Assuming function cam 66 is in the record position as shown in Fig. 3 and it is desired to shift to the rapid forward function, it is necessary with the present control apparatus only to move rapid speed lever 17 to the right. In the right hand position of this lever, the various rapid forward drive elements become operative to drive the tape forward at rapid speed, as more fully explained in the aforesaid prior application. Remembering that the tape during the record function is driven by capstan 43 and pressure roller 45, it will be seen that these elements must be separated before the tape can be driven in rapid speed. Otherwise, tape breakage or distortion would result.

Arm 117 of trip lever 116 has spaced inclined edges 130 and 131, the edge 130 lying to the right of rapid speed lever arm 115 and the edge 131 lying to the left of the arm. In the first part of movement of arm 115 to the right to shift to the rapid forward function, arm 115 engages inclined edge 130 of trip lever 116 and the trip lever is rotated in counterclockwise direction. This rotary movement, acting through the lost motion connection with pawl-carrying member 97, is effective to rotate the latter in counterclockwise direction and thus withdraw pawl 100 from record shoulder 78. When this occurs, cam 66 rotates to "stop" position and pressure roller 45 is withdrawn from capstan 43. Continued movement of arm 115 establishes the rapid forward drive and the tape is free to travel at the rapid speed.

The same action of trip lever 116 occurs when shifting to the rewind function except that arm 115 of the rapid speed lever 17 engages inclined edge 131. In both cases trip lever 116 moves counterclockwise against the force of bias spring 121. In each case when rapid speed lever 17 is returned to the neutral, central position shown in Fig. 3, bias spring 121 returns trip lever 116 to the position shown in Fig. 3 so that pawl-carrying member 97 is permitted to operate without interference by the trip lever.

The action of trip lever 116 is the same as just described when function cam 66 is in playback position, namely, trip lever 116 is effective to disengage pawl 100 from playback shoulder 79 at the start of the movement of rapid speed lever arm 115 for the shift into either rapid forward or rewind.

An interlock feature is provided to prevent a shift of function knob 30 into record or playback positions at a time when one or the other of the rapid drives is in effect. If the rapidly traveling tape, when being driven in rapid forward or rewind, were gripped between driving capstan 43, which rotates at relatively slow speed, and pressure roller 45, the tape would break or be seriously distorted. The present interlock feature prevents the engagement of pressure roller 45 with capstan 43 when the tape is traveling at rapid speed or, if the machine is turned "off," when rapid lever 17 is in either rapid function position.

This interlock feature includes a lock member 135 which is pivoted on post 83. Member 135 has a modified Z-shape, and the pivot point is in the central portion of the member. A spring 136 biases lock member in counterclockwise direction.

Arm portion 137 of lock member 135 which extends to the left of post 83 is in effective relation with upstanding arm 89 of cam driver 88. This portion of member 135 is biased toward driver 88 by the aforesaid spring 136. A recess 138 is provided in the edge of arm portion 137, and at certain times upstanding arm 89 is received within the recess to lock cam driver 88 against rotation, as will be seen.

Arm portion 140 of lock member 135 extends to the right of post 83 and normally is in engagement with upstanding lug 120 of trip lever 116. The bias of spring 136 holds arm portion 140 against lug 120, as shown in Fig. 3.

When movable trip lever 116 is rotated counterclockwise to trip position in response to actuation of rapid lever 17, function cam 66 is returned to neutral or "stop" position, as previously described. Also, upstanding lug 120 on trip lever 116 is displaced and thus allows a corresponding displacement of arm portion 140 of lock member 135. This latter displacement permits lock member 135 to move counterclockwise in response to bias spring 136 whereby arm portion 137 moves toward the upstanding arm 89 of cam driver 88 and arm 89 is received within recess 138. This relationship is shown in Fig. 2, and it will be seen that cam driver 88 is fixed against appreciable rotation by the location of arm 89 within recess 138.

When trip lever 116 returns to its non-function or neutral position shown in Fig. 3, lug 120 thereof, by virtue of its engagement with arm portion 140 of lock member 135, rotates lock member 135 to the position shown in Fig. 3 where it does not restrain rotation of cam driver 88. Thus, when neither rapid drive is in effect (trip lever 116 not in trip position), function knob 30 is free to be moved in either direction to shift the recorder into either the play or record functions.

It is to be noted that lock member 135 rotates into locking relation with cam driver 88 during the first portion of the travel path of rapid lever 17 away from center, neutral position. Conversely, when rapid lever 17 is returned to neutral position from rapid forward or rapid rewind positions, lock member 135 remains in locking relation with cam driver 88 until the last portion of the travel path. During the first portions of the return travel paths of lever 17, the brake assemblies 60 and 61 are effective to stop reels 13 and 14. Thus it is impossible to rotate function knob to shift into slow drive for record or playback until the tape has stopped following an instance of travel in rapid forward or rapid rewind. This, of course, avoids tape distortion or breakage as would occur if the rapidly moving tape were snubbed between slowly rotating capstan 43 and pressure roller 45.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. In a magnetic recorder-reproducer wherein the record medium is driven in record and playback by a rotating capstan working against a pressure roller mounted on a pivoted arm and wherein said pivoted arm is spring biased in a direction to separate said pressure roller from said capstan, the combination therewith of control apparatus comprising: a function shaft, a function cam on said function shaft, said function cam having a pair of camming portions and a pair of shoulder portions in correlated relation with said camming portions, a cam driver having a lost motion connection with said function cam and a cam part in effective relation with said pair of shoulder portions, a pawl-carrying member mounted in a pivotal manner adjacent said function cam, the pawl of said member being biased against said function cam and engageable, depending on the direction the cam is manually rotated, with one or the other of said pair of shoulder portions to maintain the cam in rotated position, a function arm mounted in a pivotal manner and effective to control the position of said pressure roller in relation to said capstan, said function arm having portions engaged by one or the other of said pair of camming portions to effect engagement of said pressure roller with said capstan, said cam part of said cam driver, when the latter is manually rotated within the extent of its lost motion connection, being effective to disengage said pawl from a shoulder portion whereby the bias of the pressure roller arm applies a force to said function arm which rotates said function cam to neutral position to permit said pressure roller to separate from said capstan.

2. In a magnetic recorder-reproducer wherein the record medium is driven in record and playback by a rotating capstan working against a disengageable pressure roller which is spring biased in a direction to separate said pressure roller from said capstan, the combination therewith of control apparatus comprising: a function shaft, a function cam on said function shaft, said function cam having a pair of camming portions and a pair of shoulder portions in correlated relation with said camming portions, a cam driver having a lost motion connection with said function cam and a cam part in effective relation with said pair of shoulder portions, a pawl-carrying member mounted in a pivotal manner, the pawl of said member being biased against said function cam and engageable, depending on the direction the cam is manually rotated, with one or the other of said pair of shoulder portions to maintain the cam in rotated position, a function arm effective to control the position of said pressure roller in relation to said capstan, said function arm having portions engaged by one or the other of said pair of camming portions to effect engagement of said pressure roller with said capstan, said cam part of said cam driver, when the latter is manually rotated within the extent of its lost motion connection, being effective to disengage said pawl from a shoulder portion whereby the bias of said pressure roller applies a force to said function arm which rotates said function cam to neutral position to permit said pressure roller to separate from said capstan.

3. In a magnetic recorder-reproducer having a drive capstan and a disengageable pressure roller which is spring biased in a direction to separate said pressure roller from said capstan, said recorder-reproducer also having a rapid speed lever movable in one direction for rapid forward drive and in the other direction for rapid rewind drive, the combination therewith of control apparatus comprising: a function shaft, a function cam on said function shaft, a cam driver having a lost motion connection with said function cam and a cam part in effective relation with said function cam, a movable pawl-carrying member having a pawl biased against said function cam and engageable with said cam to maintain said cam in one or the other of two rotated positions, a function arm effective to control the position of said pressure roller in relation to said capstan, said function arm having portions engaged by said function cam to effect engagement of said pressure roller with said capstan, said cam part on said cam driver, when the latter is rotated within the extent of its lost motion connection, being effective to disengage said pawl from said function cam whereby the bias of said pressure roller applies a force to said function arm which rotates said function cam to neutral position to permit said pressure roller to separate from said capstan.

4. The combination of claim 3 with the addition of an "off-on" switch having a control knob, said control knob having a depending finger in effective relation with said pawl-carrying member whereby, when said control knob is moved from "on" to "off" position, said finger moves said pawl-carrying member to disengage said pawl from said function cam.

5. The combination of claim 3 with the addition of an "off-on" switch assembly having a camming portion in effective relation with said pawl-carrying member whereby, when said switch assembly is actuated from "on" to "off" position, said camming portion moves said pawl-carrying member to disengage said pawl from said function cam.

6. The combination of claim 3 with the addition of a movable trip lever in effective relation with said rapid speed lever, said rapid speed lever imparting movement to said trip lever as said rapid speed lever is moved in both of its directions, said trip lever having a lost motion connection with said pawl-carrying member whereby said pawl-carrying member is movable independently of said rapid speed trip lever and whereby movement of said trip lever, when said function cam is engaged by said pawl, moves said pawl-carrying member to disengage said pawl from said function cam.

7. The combination of claim 6 with the addition of an "off-on" switch assembly having a camming portion in effective relation with said pawl-carrying member whereby, when said switch assembly is actuated from "on" to "off" position, said camming portion moves said pawl-carrying member to disengage said pawl from said function cam.

8. The combination of claim 6 with the addition of a movable function cam lock member, said lock member being biased in a direction for locking engagement with said cam driver, said locking engagement being possible only when said function cam is in neutral position, said lock member engaging said trip lever whereby the latter, unless moved to trip position, holds said lock member out of locking engagement with said cam driver, movement of said trip lever permitting the bias of said lock member to move said lock member into locking engagement with said cam driver.

9. The combination of claim 6 with the addition of a movable function cam lock member, said lock member being biased in a direction to lock said function cam against rotation, said lock relationship being possible only when said function cam is in neutral position, said lock member engaging said trip lever whereby the latter, unless moved to trip position, holds said lock member out of lock relationship, movement of said trip lever permitting the bias of said lock member to move said lock member into lock relationship with said function cam.

10. In a magnetic recorder-reproducer having a drive capstan and a disengageable pressure roller which is spring biased in a direction to separate said pressure roller from said capstan, said capstan and said pressure roller cooperating to provide slow speed drive, said recorder-reproducer also having a rapid speed lever movable in one direction for rapid forward drive and in the other direction for rapid rewind drive, the combination therewith of control apparatus comprising: manually operable first control means alternatively effecting engagement and disengagement of said pressure roller and said capstan respectively to establish and interrupt slow speed drive, automatically operable second control means cooperating with said first control means to hold said first control means in position whereby said pressure roller engages said capstan, and manually operable third control means cooperating with said second control means to effect release between said second and first control means whereby said first control means permits said pressure roller to separate from said capstan.

11. In a magnetic recorder-reproducer having a drive capstan and a disengageable pressure roller which is spring biased in a direction to separate said pressure roller from said capstan, the combination therewith of control apparatus comprising: a function shaft, a function cam on said function shaft, a cam driver having a lost motion connection with said function cam and a cam part in effective relation with said function cam, a movable pawl-carrying member having a pawl biased against said function cam and engageable with said cam to maintain said cam in one or the other of two rotated positions, a function arm effective to control the position of said pressure roller in relation to said capstan, said function arm having portions engaged by said function cam to effect engagement of said pressure roller with said capstan, said cam part on said cam driver, when the latter is rotated within the extent of its lost motion connection, being effective to disengage said pawl from said function cam whereby the bias of said pressure roller applies a force to said function arm which rotates said function cam to neutral position to permit said pressure roller to separate from said capstan.

12. The combination of claim 11 with the addition of an "off-on" switch assembly having a camming portion in effective relation with said pawl-carrying member whereby, when said switch assembly is actuated from "on" to "off" position, said camming portion moves said pawl-carrying member to disengage said pawl from said function cam.

References Cited in the file of this patent

UNITED STATES PATENTS

| | | |
|---|---|---|
| 2,558,432 | Haloski | June 26, 1951 |
| 2,585,724 | Barany | Feb. 12, 1952 |
| 2,596,536 | Dale | May 13, 1952 |
| 2,665,855 | Stone | Jan. 12, 1954 |
| 2,673,040 | Williams | Mar. 23, 1954 |
| 2,676,212 | Williams | Apr. 20, 1954 |